United States Patent
Kish et al.

(10) Patent No.: US 9,715,508 B1
(45) Date of Patent: Jul. 25, 2017

(54) DYNAMIC ADAPTATION OF FEATURE IDENTIFICATION AND ANNOTATION

(71) Applicant: Cogniac, Corp., San Jose, CA (US)

(72) Inventors: William S. Kish, Saratoga, CA (US); Victor Shtrom, Los Altos, CA (US); Huayan Wang, Milpitas, CA (US)

(73) Assignee: Cogniac, Corp., San Jose, CA (US)

( * ) Notice: Subject to any disclaimer, the term of this patent is extended or adjusted under 35 U.S.C. 154(b) by 0 days.

(21) Appl. No.: 15/081,949

(22) Filed: Mar. 28, 2016

(51) Int. Cl.
  *G06K 9/00* (2006.01)
  *G06F 17/30* (2006.01)
  *G06K 9/46* (2006.01)
  *G06K 9/62* (2006.01)
  *G06K 9/03* (2006.01)

(52) U.S. Cl.
  CPC ......... *G06F 17/30268* (2013.01); *G06K 9/03* (2013.01); *G06K 9/46* (2013.01); *G06K 9/6256* (2013.01)

(58) Field of Classification Search
  CPC ............... G06T 11/60; G06F 17/30249; G06F 17/30268; G06K 9/6255; G06K 9/66; G06K 9/6216; G06K 9/00228
  See application file for complete search history.

(56) References Cited

U.S. PATENT DOCUMENTS

| | | | | |
|---|---|---|---|---|
| 5,963,670 A * | 10/1999 | Lipson | ................ | G06F 17/3025 382/224 |
| 2009/0179895 A1* | 7/2009 | Zhu | .................. | G06F 17/30241 345/424 |
| 2013/0311868 A1* | 11/2013 | Monney | ............ | G06F 17/30017 715/230 |
| 2014/0016820 A1* | 1/2014 | Roberts | ............. | G06F 17/30805 382/103 |
| 2014/0093174 A1* | 4/2014 | Zhang | ............... | G06F 17/30259 382/190 |
| 2014/0104309 A1* | 4/2014 | Kandogan | .............. | G09G 5/377 345/629 |
| 2015/0268058 A1* | 9/2015 | Samarasekera | .... | G06K 9/00637 701/409 |

OTHER PUBLICATIONS

"ImageNet Classification with Deep Convolutional Neural Networks," Alex Krizhevsky, et al., Advances in Neural Information Processing Systems 25 (NIPS 2012), http://papers.nips.cc/paper/4824-imagenet-classification-with-deep-convolutional-neural-networks.pdf.

* cited by examiner

*Primary Examiner* — Amir Alavi
(74) *Attorney, Agent, or Firm* — Steven Stupp

(57) ABSTRACT

A system may use a configurable detected to identify a feature in a received image and an associated candidate tag based on user-defined items of interest, and to determine an associated accuracy metric. Moreover, based on the accuracy metric, costs of requesting the feedback from one or more individuals and a feedback threshold, the system may use a scheduler to selectively obtain feedback, having a feedback accuracy, about the candidate tag from the one or more individuals. Then, the system may generate a revised tag based on the feedback when the feedback indicates the candidate tag is incorrect. Next, the system presents a result with the feature and the candidate tag or the revised tag to another electronic device. Furthermore, based on a quality metric, the system may update labeled data that are to be used to retrain the configurable detector.

23 Claims, 6 Drawing Sheets

DYNAMIC ADAPTATION OF FEATURE IDENTIFICATION AND ANNOTATION

BACKGROUND

The described embodiments relate to a technique for identifying and annotating a feature in an image using a configurable detector, including selectively obtaining feedback about a candidate tag associated with the identified feature and updating labeled data used to train the configurable detector based, at least in part, on the feedback.

RELATED ART

Ongoing advances in the capabilities of electronic devices are making them increasingly popular. In addition, the widespread availability of electronic devices and their increasing functionality has resulted in a large number of applications.

For example, many electronic devices include image sensors, such as CMOS image sensors, that users and applications use to acquire images and videos. The content in these images and videos often includes useful information for the users. In principle, if the associated subset of the content that includes the information can be accurately identified, additional value-added services can be provided to the users.

In practice, it can be difficult to accurately identify the subset of the content (which are sometimes referred to as 'features') in the images. In particular, in order for a detector to accurately identify features in images, the detector typically needs to be first trained using a dataset. However, the dataset usually needs to include multiple instances of the features. It can be challenging to obtain multiple instances of an arbitrary feature a priori, which often degrades the quality of the trained detector and, thus, the accuracy of the subsequent feature identification.

Consequently, feature identification is often restricted to certain types of features for which, a priori, there are a large number of instances available in a training dataset. In addition to restricting the feature identification, this limitation often restricts the ability of feature-identification systems to self-train or dynamically evolve. Because these limitations constrain and degrade the quality of the identified features, they are also frustrating for the users and can adversely impact the user experience.

SUMMARY

The described embodiments relate to a system (such as a computer system) that provides a result. In particular, the system includes an interface circuit that, during operation, communicates, via a network, with another electronic device. Moreover, the system includes a processor, and memory that stores a program module. During operation, the processor executing the program module receives input data including an image. Then, the processor identifies, using a configurable detector associated with labeled data, a feature in the image and an associated candidate tag based on user-defined items of interest, and determines an associated accuracy metric (such as a probability of accuracy or a difference or distance from a target) based on the feature and the candidate tag, where the user-defined items of interest include one or more features and one or more associated tags. Moreover, the processor selectively obtains, using a scheduler, feedback, having a feedback accuracy, about the candidate tag from a set of individuals based on the accuracy metric, a cost of requesting the feedback and a feedback threshold, where the scheduler dynamically selects a given individual in the set of individuals based on a given cost of requesting the feedback from the given individual. Next, the processor generates a revised tag based on the feedback when the feedback indicates the candidate tag is incorrect. Furthermore, the processor presents the result to the other electronic device, where the result includes: the feature and the candidate tag when the accuracy metric exceeds a detection threshold; or the feature and the revised tag when the feedback accuracy exceeds the detection threshold. Additionally, the processor updates, based on a quality metric, the labeled data to include the input data, the feature and one of the candidate tag and the revised tag, where the updated labeled data are to be used to retrain the configurable detector.

Note that the cost may be determined based on user-specified information and/or behavior of the given individual in response to prior requests for feedback. For example, the user-specified information may include: a frequency of feedback requests, a number of feedback requests, and/or a value of the feedback.

Moreover, the scheduler may dynamically select the given individual based on at least one of: an area of expertise of the given individual, behavior of the given individual in response to prior requests for feedback, and a feedback accuracy of prior feedback from the given individual.

Furthermore, the processor may adjust types of feedback obtained from the set of individuals based on the accuracy metric.

Additionally, the feedback from the given individual may include: a first indication that the candidate tag is correct, a second indication that the candidate tag is incorrect, or a third indication that it is unknown whether the candidate tag is correct. Note that, when the feedback includes the second indication, the feedback may include a correction for the candidate tag.

In some embodiments, the processor adapts the feedback threshold based on the accuracy metric.

Moreover, the processor may adapt the detection threshold based on: the feedback from the set of individuals and/or an economic value associated with the feature.

Note that the set of individuals may include two or more individuals and the feedback accuracy for the given individual may be based on the feedback obtained from the set of individuals.

Furthermore, the input data may include other types of data than the image. For example, the processor may receive metadata associated with the input data. The metadata may include: information specifying a location of a source of the input data, a type of the source, other features in the image than the feature, attributes of the image other than the candidate tag, and/or a time of day the image was acquired. Note that the processor may: select a subset of the labeled data based on the metadata; and train the configurable detector based on the selected subset. Alternatively or additionally, the processor may select the configurable detector in a set of configurable detectors based on the metadata.

Additionally, the feedback may be obtained when the accuracy metric is less than the feedback threshold.

Moreover, when the accuracy metric is greater than the feedback threshold, the feedback may be obtained based on: a pseudorandom value, or a random value.

Furthermore, the quality metric may be based on: the accuracy metric, the feedback accuracy, and/or a number of individuals in the set of individuals.

Additionally, the processor may retrain the configurable detector based on the updated labeled data.

In some embodiments, presenting the result involve automatically triggering an application on the other electronic device that presents the result.

In another embodiment, the program module is subdivided into sub-program modules that are executed by the system. For example, a configurable detector, associated with labeled data, may: receive the input data including the image; and identify the feature in the image and the associated candidate tag based on the user-defined items of interest, and determine the associated accuracy metric based on the feature and the candidate tag, where the user-defined items of interest include the one or more features and the one or more associated tags. Moreover, a scheduler may selectively obtain the feedback, having the feedback accuracy, about the candidate tag from the set of individuals based on the accuracy metric, a cost of requesting the feedback and the feedback threshold, where the scheduler dynamically selects the given individual in the set of individuals based on a given cost of requesting the feedback from the given individual. Furthermore, a revision module may generate the revised tag based on the feedback when the feedback indicates the candidate tag is incorrect. Additionally, a presentation module may present the result to the other electronic device, where the result includes: the feature and the candidate tag when the accuracy metric exceeds a detection threshold; or the feature and the revised tag when the feedback accuracy exceeds the detection threshold. Moreover, a training module may update, based on the quality metric, the labeled data to include the input data, the feature and one of the candidate tag and the revised tag, where the updated labeled data are to be used to retrain the configurable detector.

Another embodiment provides a computer-program product for use with the system. This computer-program product includes instructions for at least some of the operations performed by the system.

Another embodiment provides a method for providing the result.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

Figure 1:
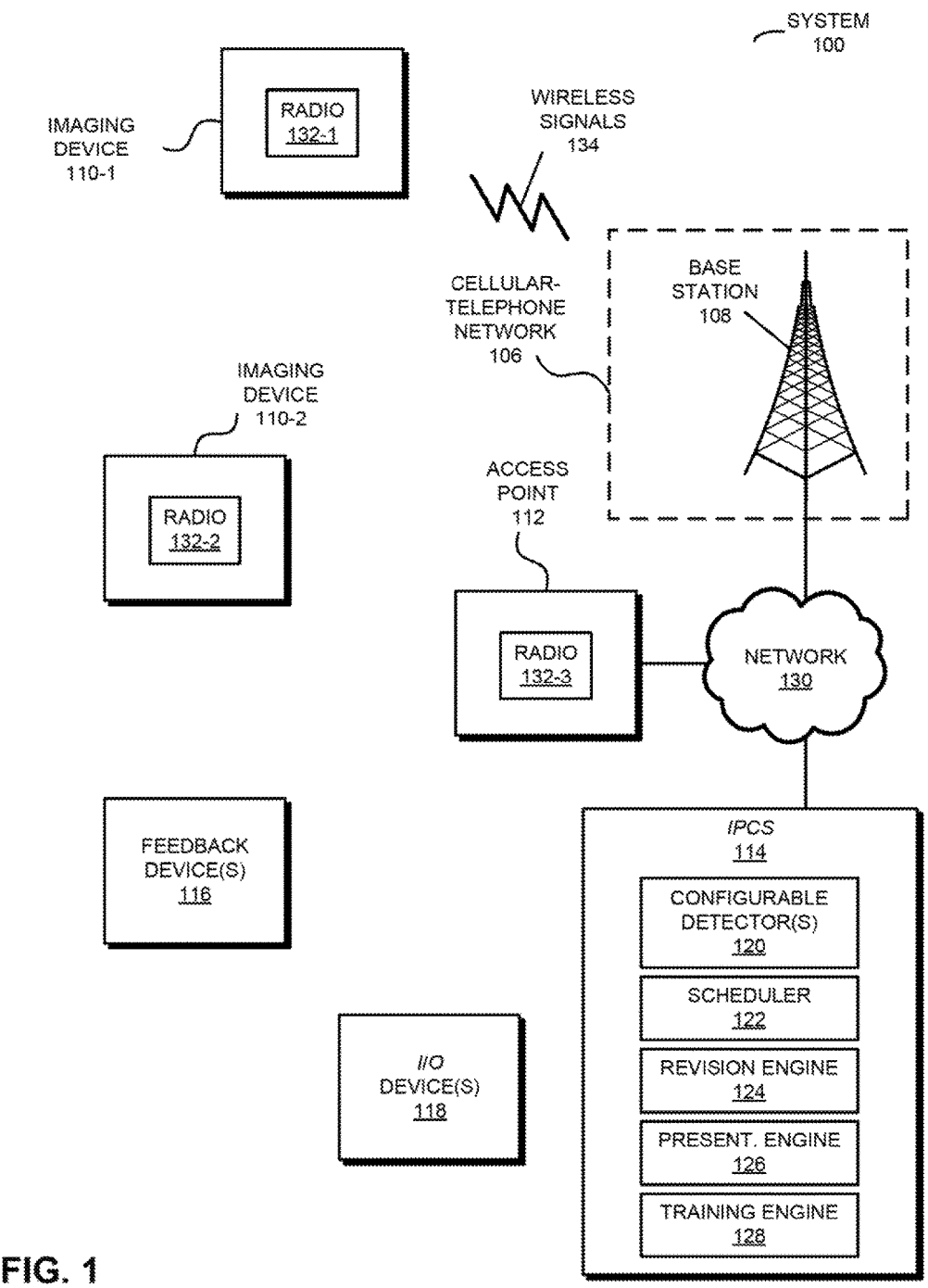
FIG. 1 is a block diagram illustrating a system that dynamically adapts identification and annotation of features in images in accordance with an embodiment of the present disclosure.

Table 1 provides pseudo-code for a random process for user-feedback selection in accordance with an embodiment of the present disclosure.

Table 2 provides pseudo-code for a second process for user-feedback selection in accordance with an embodiment of the present disclosure.

Table 3 provides pseudo-code for configurable user-feedback periods in accordance with an embodiment of the present disclosure.

Table 4 provides pseudo-code for a user-feedback schedule based on cost metrics and a history of user feedback in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

A system may use a configurable detector to identify a feature in a received image and an associated candidate tag based on user-defined items of interest, and to determine an associated accuracy metric (such as a probability of accuracy or a difference or distance from a target). Moreover, based on the accuracy metric, costs of requesting the feedback from one or more individuals and a feedback threshold, the system may use a scheduler to selectively obtain feedback, having a feedback accuracy, about the candidate tag from the one or more individuals. Then, the system may generate a revised tag based on the feedback when the feedback indicates the candidate tag is incorrect. Next, the system presents a result with the feature and the candidate tag or the revised tag to another electronic device. Furthermore, based on a quality metric, the system may update labeled data that are to be used to retrain the configurable detector.

By dynamically adapting feature identification and annotation (i.e., determining the associated tags), this image-processing technique allows content (such as one or more features) in an image to be identified and annotated even when the dataset used to train the configurable detector initially only includes a single instance of the feature. Consequently, the image-processing technique allows the dataset with the labeled data to be built up over time, thereby allowing the configurable detector to dynamically evolve to incrementally improve the accuracy of the feature identification and annotation. This capability may allow a wide variety of features to be identified in images. Furthermore, by only selectively requesting the feedback, the image-processing technique may respect the time and effort of the one or more individuals, which may improve compliance and accuracy when responding to requests for feedback. Therefore, the image-processing technique may provide flexible and accurate feature identification and annotation, and may improve the user experience when using the system.

In the discussion that follows, an individual or a user may be a person. Also, or instead, the image-processing technique may be used by any type of organization, such as a business, which should be understood to include for-profit corporations, non-profit corporations, groups (or cohorts) of individuals, sole proprietorships, government agencies, partnerships, etc.

Moreover, in the discussion that follows, electronic devices and/or components in the system may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G communication protocol, such as UMTS, LTE), an IEEE 802.3 standard (which is sometimes referred to as 'Ethernet'), etc. In the discussion that follows, Ethernet and Wi-Fi are used as illustrative examples.

Communication among electronic devices is shown in FIG. 1, which presents a block diagram illustrating a system 100 that dynamically adapts identification and annotation of features in images. In particular, system 100 includes one or more imaging devices 110 (such as an electronic device that includes a CMOS image sensor, a CCD, a camera, etc.), optional base station 108 in cellular-telephone network 106, optional access point 112, an image-processing computer system (IPCS) 114 (such as a server), one or more feedback devices 116 and one or more input/output (I/O) devices 118 (which are sometimes collectively referred to as 'components' in system 100). For example, the one or more feedback devices 116 and/or the one or more I/O devices 118 may include one or more instances of electronic devices, such as portable electronic devices, e.g., cellular telephones. Moreover, image-processing computer system 114 may include: one or more configurable detectors 120, a scheduler 122, a revision engine (or module) 124, a presentation engine (or module) 126 and a training engine (or module) 128.

Note that components in system 100 may communicate with each other via a network 130, such as the Internet, a cellular-telephone network and/or a wireless local area network (WLAN). For example, a user may use I/O device 118-1 to provide, via network 130, information to image-processing computer system 114 that specifies or defines user-defined items of interest, such as one or more features and one or more associated tags. Moreover, imaging device 110-1 may communicate, via network 130 input data (such as an acquired image and/or metadata associated with the image) to image-processing computer system 114. Furthermore, image-processing computer system 114 may provide, via network 130, one or more requests for feedback from at least a set of one or more individuals (who are sometimes referred to as a 'set of individuals') associated with the one or more feedback devices 116, and may subsequently receive the feedback from at least some members of the set of one or more individuals. Additionally, image-processing computer system 114 may provide, via network 130, a result based on the feature identification and annotation to I/O device 118-1. In embodiments where the communication involves wireless communication, the wireless communication includes: transmitting advertising frames on wireless channels, detecting another component in system 100 by scanning wireless channels, establishing connections (for example, by transmitting association requests), and/or transmitting and receiving packets (which may include the user-defined items of interest, the input data, the one or more requests, the feedback, and/or the result).

Figure 6:
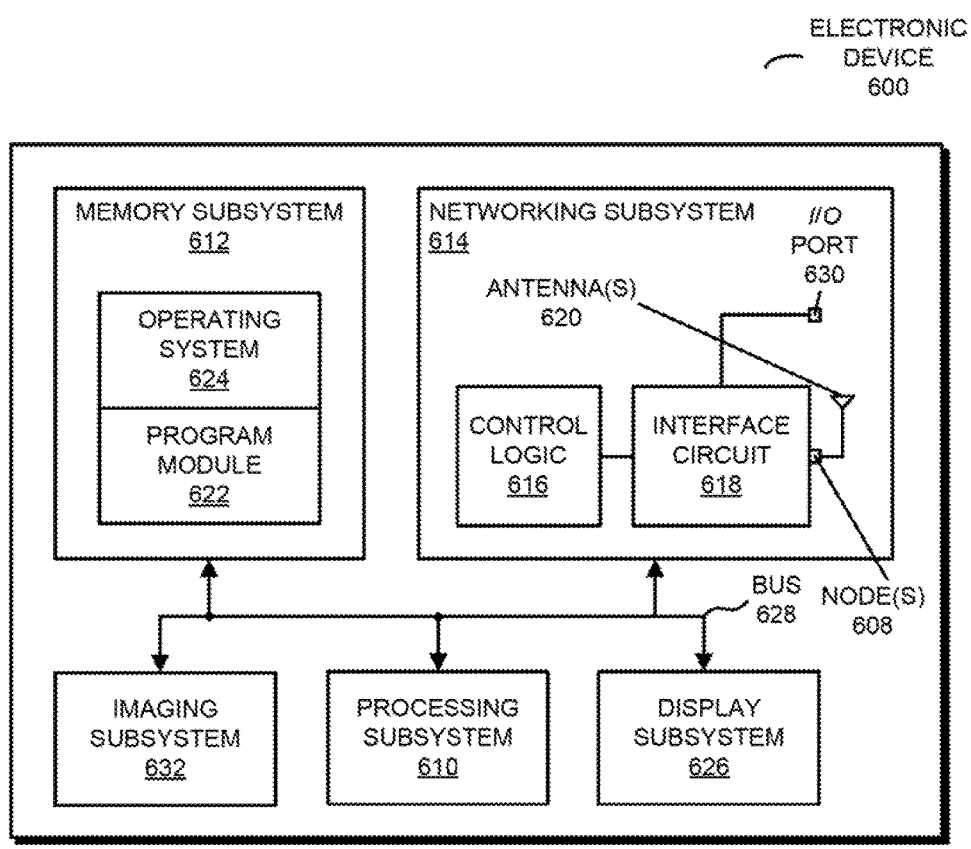
FIG. 6 is a block diagram illustrating an electronic device in the system of FIG. 1 in accordance with an embodiment of the present disclosure.

As described further below with reference to FIG. 6, the one or more imaging devices 110, optional base station 108, optional access point 112, image-processing computer system 114, the one or more feedback devices 116 and the one or more I/O devices 118 may include subsystems, such as a networking subsystem, a memory subsystem and a processor subsystem. In addition, the one or more imaging devices 110, optional base station 108, optional access point 112, image-processing computer system 114, the one or more feedback devices 116 and/or the one or more I/O devices 118 may include radios 132 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 134 (represented by jagged lines) are transmitted by radios 132 in the components. For example, radio 132-1 in imaging device 110-1 may transmit information (such as packets) using wireless signals. These wireless signals may be received by radios 130 in one or more of the other components, such as by optional base station 108 or optional access point 112. This may allow imaging device 110-1 to communicate information to optional base station 108 or optional access point 112, and thus, to image-processing computer system 114.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame (such as the user-defined items of interest, the input data, the one or more requests, the feedback, the result, etc.).

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, it is often difficult to analyze images to accurately identify features and to determine associated annotation (such as tags) when a training dataset is either too small (i.e., without enough instances of a feature) or unavailable. Moreover, as described further below with reference to FIG. 2, in order to address this problem image-processing computer system 114 may analyze input data received from one of imaging devices 110

(such as imaging device 110-1) using one of configurable detectors 120 based on the user-defined items of interest. In particular, a user of I/O device 118-1 may provide information to image-processing computer system 114 that specifies the user-defined items of interest, such as one or more features (including an arbitrary feature that is of interest to the user) that can be identified in an image and one or more tags or labels associated with the one or more features. For example, the user may specify the user-defined items of interest using a user interface associated with a software application that is resident on and that executes on I/O device 118-1. Alternatively, the user may interact with a web page that is provided by image-processing computer system 114, and which is rendered by a web browser on I/O device 118-1. In some embodiments, at least a portion of the software application executing on I/O device 118-1 may be an application tool that is embedded in the web page, and that executes in a virtual environment of the web browser. Thus, the application tool may be provided to the user via a client-server architecture. Note that the software application operated by the user may be a standalone application or a portion of another application that is resident on and that executes on I/O device 118-1 (such as a software application that is provided by I/O device 118-1 or that is installed on and that executes on I/O device 118-1).

Subsequently, one of imaging devices 110 (such as imaging device 110-1) may provide input data (such as at least one image, metadata and/or other types of data than an image) acquired in an environment to image-processing computer system 114. After receiving the input data, image-processing computer system 114 may identify a feature in at least the one image and an associated candidate tag based on the user-defined items of interest. For example, image-processing computer system 114 may identify the feature and the associated candidate tag using one of one of configurable detectors 120 (such as configurable detector 120-1) and the user-defined items of interest. Furthermore, configurable detector 120-1 may determine an associated accuracy metric (such as a probability of accuracy, e.g., 50, 75 or 90%, or a difference or distance from a target, e.g., a mean-square error) for the identified feature and the candidate tag using configurable detector 120-1 based on the identified feature and the candidate tag.

Note that configurable detector 120-1 may be selected based on the metadata. (Alternatively, configurable detector 120-1 may have been pre-selected or pre-specified before the input data was received.) In particular, configurable detector 120-1 may be associated with: a particular location (such as a fixed location or a variable location) of the source of the input data (i.e., a location of imaging device 110-1 when the input data was acquired); a type of the source (such as a type of imaging device or sensor); an identifier of the source; other features in the image than the feature (such as another object in the image); an attribute of the image other than the candidate tag (such as a location of a light source, a signal-to-noise ratio, a histogram of the light intensity in the image, an f-number, another metric of the light intensity, an image-quality metric, etc.); and/or a time of day the image was acquired. Then, if the metadata specifies one or more of these items, image-processing computer system 114 can select configurable detector 120-1 out of configurable detectors 120 based on the metadata. Alternatively or additionally, selecting configurable detector 120-1 may involve training configurable detector 120-1. For example, image-processing computer system 114 can select a subset of labeled data in a dataset (such as at least another instance of the feature and a tag in another image) based on the metadata, and image-processing computer system 114 may train configurable detector 120-1 based on the selected subset.

However, the feature identification and annotation performed by configurable detector 120-1 may not be perfect. Therefore, as described further below with reference to FIG. 4, using scheduler 122 and based on the accuracy metric and a feedback threshold, image-processing computer system 114 may selectively obtain feedback, having a feedback accuracy (which is described further below), about the feature and/or the candidate tag from one or more of a set of one or more individuals (which may or may not include the user, and who may be predefined or pre-identified by the user and/or image-processing computer system 114). For example, scheduler 122 may indicate that feedback is needed if the accuracy metric is less than the feedback threshold. Then, image-processing computer system 114 may provide, via network 130, one or more requests for feedback to the set of one or more individuals associated with the one or more feedback devices 116, and may subsequently receive the feedback from at least one of the individuals in the set. In some embodiments, scheduler 122 adapts the feedback threshold based on the accuracy metric. Thus, if the accuracy metric for configurable detector 120-1 is, on average, sufficiently high (such as greater than 80 or 90%), the feedback threshold may be increased so that the frequency of feedback requests is reduced.

One challenge in requesting feedback from a given individual is to do so when it is necessary and likely to be beneficial (such as when the given individual's expertise can be used and the given individual is likely to respond and provide feedback having a sufficiently high feedback accuracy), but to avoid asking the given individual for feedback too often (i.e., an excessive feedback frequency) and/or too many times in total (which may result in the given individual not responding to a request for feedback or may result in poor quality feedback, i.e., a low feedback accuracy). In order to address these challenges, scheduler 122 may dynamically select a given individual in the set of one or more individuals based on a generalized 'cost' of requesting the feedback from the given individual. This generalized cost may have a variety of units or an economic value (which may or may not include a monetary denomination) and is used to assess, in a dynamic or time-varying manner, whether (or not) the given individual should be selected to provide feedback.

Note that scheduler 122 may determine or calculate the cost based on user-specified information and/or behavior of the given individual in response to one or more prior requests for feedback (such as whether the given individual responded to particular requests and/or whether the associated feedback accuracy of the feedback from the given individual was sufficient, e.g., greater than 50%). In particular, the user-specified information may include: a frequency of feedback requests (such as a maximum frequency), a number of feedback requests (such as a maximum number of feedback requests per day or per week), and/or a value of the feedback (such as an economic value or a metric for how important it is that the feature and the candidate tag are identified correctly, e.g., an economic value for a false positive or a true positive). Thus, if the user indicates it is very important that the feature and the candidate tag are identified correctly, scheduler 122 may lower the value of the cost so the feedback is requested more often or may lower the value of the cost for one or more individuals who have relevant experience or expertise (e.g., based on a probabilistic match between their experience or expertise and the feature, the candidate tag and/or the metadata) and/or who are more likely to provide a high feedback accuracy (such as more than 80 or 90%).

Consequently, scheduler 122 may dynamically select the given individual based on at least one of: an area of expertise of the given individual, behavior of the given individual in response to prior requests for feedback, and a feedback accuracy of prior feedback from the given individual. (Stated differently, scheduler 122 may dynamically map items of interest to a user to a set of one or more individuals who can selectively provide feedback.) In some embodiments, scheduler 122 determines or calculates the cost for the given individual once, after a time interval (such as each day, week, etc.), and/or as needed (such as when the feedback accuracy is too low). Moreover, scheduler 122 may determine or calculate multiple values for the cost for the given individual at different times of the day or for different days of the week. For example, the cost may be higher at inconvenient times of the day or days of the week, such as at night or during the weekend. In some embodiments, scheduler 122 initially uses a user-defined or specified cost, but over time, as the behaviors of the given individual become clearer based on a historical log of behaviors in response to feedback requests, scheduler 122 dynamically determines or calculates the cost for the given individual.

Furthermore, scheduler 122 may adjust types of feedback obtained from the set of one or more individuals based on the accuracy metric. For example, when the accuracy metric is high (such as greater than 75%), the type of feedback obtain may include refinements to the candidate tag. Alternatively, when the accuracy metric is low (such as less than 50%), the type of feedback obtain may include whether or not the identified feature and/or the candidate tag are correct.

As noted previously, scheduler 122 may selectively obtain the feedback when the accuracy metric is less than the feedback threshold. However, even in this case, the feedback requests to the given individual may occur with a predefined probability (thus, the given individual may not be asked to provide feedback every time). Alternatively or additionally, when the accuracy metric is greater than the feedback threshold, scheduler 122 may selectively obtain the feedback based on a generated pseudorandom value or a random value between 0 and 1. In this way, even when configurable detector 120-1 is working well (as indicated by the accuracy metric), image-processing computer system 114 may continue (albeit at a reduced frequency) to obtain feedback so that the performance of configurable detector 120-1 can be further refined or improved.

As described further below with reference to FIG. 5, the feedback from the given individual may include: a first indication that the candidate tag is correct, a second indication that the candidate tag is incorrect, or a third indication that it is unknown whether the candidate tag is correct. For example, a given indication may be associated with user-interface activity information, such as when the given individual activates a virtual icon in a user interface displayed on one of feedback devices 116 by contacting a touch-sensitive display within a strike area or activates a physical key in a keyboard (or a user-interface device) associated with the user interface. Note that, when the feedback includes the second indication, the feedback may include a correction for the candidate tag, such as a correct candidate tag. Moreover, the third indication may be explicitly provided by the given individual or it may be inferred, such as when the given individual does not respond to a request for feedback. In some embodiments, the feedback indicates whether or not the identified feature is correct.

Note that the set of one or more individuals may include two or more individuals and the feedback accuracy for the given individual may be based on the feedback obtained from the set of one or more individuals. Thus, the feedback accuracy for the given individual may be determined by image-processing computer system 114 based on a statistical comparison of their feedback and the feedback provided by a remainder of the set of one or more individuals (i.e., using collaborative filtering). In some embodiments, image-processing computer system 114 determines the feedback accuracy after excluding outliers (such as feedback that is more than two or three standard deviations different from the feedback received from the majority of the set of one or more individuals, e.g., the mean feedback) and/or based on a standard deviation from the mean feedback received from the set of one or more individuals. For example, the feedback accuracy may be calculated or determined based on a cumulative probability distribution function.

When image-processing computer system 114 receives feedback that indicates the candidate tag is incorrect, image-processing computer system 114 (such as a revision module) may generate a revised tag. For example, if the feedback has a feedback accuracy exceeding a threshold (such as 80 or 90%), image-processing computer system 114 may generate the revised tag.

Furthermore, image-processing computer system 114 (such as a presentation module) may present a result to one or more input/output (I/O) devices 118. For example, image-processing computer system 114 may provide, via network 130, a result based on the feature identification and annotation to I/O device 118-1 (or another of I/O devices 118). Note that the result may include: the feature and the candidate tag when the accuracy metric exceeds a detection threshold (such as 70, 80 or 90%); or the feature and the revised tag when the feedback accuracy exceeds the detection threshold. In this way, if configurable detector 120-1 made a mistake and one of the set of one or more individuals corrects it, this feedback may be treated as equivalent to the other feature identifications and annotations made by image-processing computer system 114, and the revised tag may be surfaced or provided to at least one of I/O devices 118 when the accuracy metric exceeds the detection threshold.

Moreover, presenting the result may involve automatically triggering an application on I/O device 118-1 that presents the result. In particular, when I/O device 118-1 receives the result, the application may be launched (or may be moved to a top of stack) and the application may display the result on a display in I/O device 118-1 without any action by a recipient associated with I/O device 118-1 (such as the user or another individual). This feature may be useful when the result includes time-sensitive information, such as identification of an event (e.g., a ruptured pipeline, a fire, an accident, a dangerous situation, monitoring individuals in an environment, a security situation, a medical emergency, a state of an agriculture produce, such as a ripeness of fruit, manufacturing safety, etc.) that has a high economic value or importance. Note that image-processing computer system 114 may adapt the detection threshold based on: the feedback from one or more of the set of one or more individuals and/or an economic value associated with the feature. Thus, if the feedback indicates the identified feature and the candidate tag are correct and/or the economic value is high, the detection threshold may be reduced.

Additionally, based on a quality metric, image-processing computer system 114 may update the labeled data to include the input data, the feature and one of the candidate tag and the revised tag. The updated labeled data may be used to retrain configurable detector 120-1. For example, the quality metric may be based on: the accuracy metric, the feedback accuracy, and/or a number of individuals in the set of one or more individuals. In particular, the labeled data may be updated when the quality metric is sufficient. In an exemplary embodiment, a sufficient quality metric includes: a accuracy metric or a feedback accuracy of 50-95% (or, alternatively, an error rate or a false positive rate of 5-50%) and/or when there are sufficient individuals in the set of one or more individuals (such as sufficient individuals to obtain statistically reliable results, e.g., at least 1-20 individuals). While image-processing computer system 114 may learn or adapt the detection threshold (e.g., it may increase over time as the performance of configurable detector 120-1 improves), in other embodiments the detection threshold is user defined or is determined based on user-specified information (such as based on the economic value of identified features and tags).

In some embodiments, image-processing computer system 114 (such as a training module) retrains configurable detector 120-1 based on the updated labeled data. In this way, the dataset used to train configurable detector 120-1 may be dynamically updated as more accurate data is obtained, and the performance of configurable detector 120-1 (such as the accuracy metric) may be increased over time.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

Figure 2:
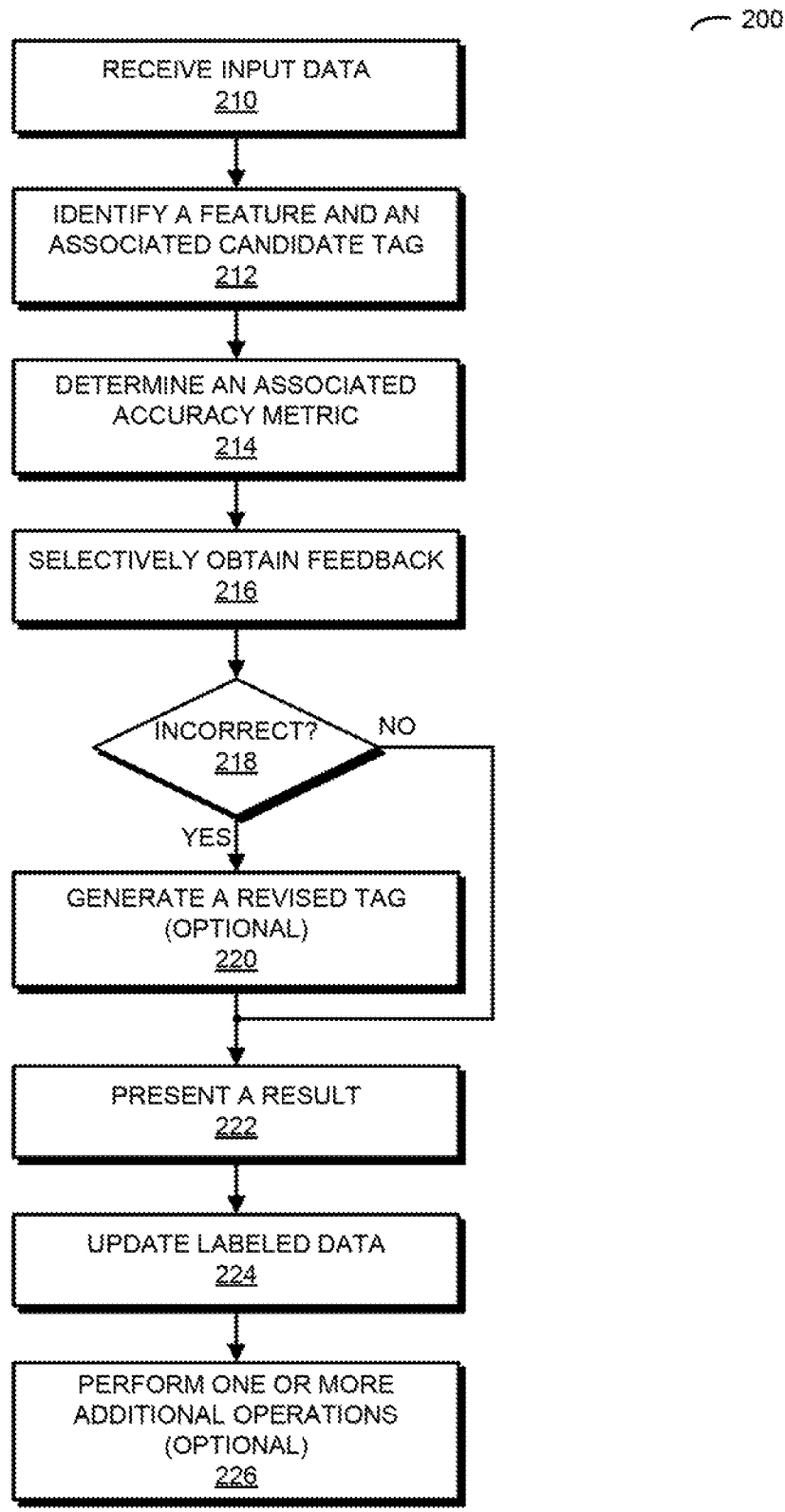
FIG. 2 is a flow diagram illustrating a method for providing a result using the system in FIG. 1 in accordance with an embodiment of the present disclosure.

FIG. 2 presents embodiments of a flow diagram illustrating method 200 for providing a result, which may be performed by a computer system (such as image-processing computer system 114 in FIG. 1). During operation, the computer system receives input data (operation 210) including an image. Then, the computer system identifies, using a configurable detector associated with labeled data, a feature in the image and an associated candidate tag (operation 212) based on user-defined items of interest, and determines an associated accuracy metric (operation 214) based on the feature and the candidate tag, where the user-defined items of interest include one or more features and one or more associated tags.

Moreover, the computer system selectively obtains, using a scheduler, feedback (operation 216), having a feedback accuracy, about the candidate tag from a set of individuals based on the accuracy metric, a cost of requesting the feedback and a feedback threshold, where the scheduler dynamically selects a given individual in the set of individuals based on a given cost of requesting the feedback from the given individual. Next, the computer system optionally generates a revised tag (operation 220) based on the feedback when the feedback indicates the candidate tag is incorrect (operation 218).

Furthermore, the computer system presents the result (operation 222) to the other electronic device, where the result includes: the feature and the candidate tag when the accuracy metric exceeds a detection threshold; or the feature and the revised tag when the feedback accuracy exceeds the detection threshold.

Additionally, the computer system updates, based on a quality metric, the labeled data (operation 224) to include the input data, the feature and one of the candidate tag and the revised tag, where the updated labeled data are to be used to retrain the configurable detector.

In some embodiments, the computer system performs one or more optional additional operations (operation 226). For example, the computer system may determine the cost based on user-specified information and/or behavior of the given individual in response to prior requests for feedback. Alternatively or additionally, the computer system may: select the configurable detector in a set of configurable detectors based on metadata associated with the input data; adjust types of feedback obtained from the set of individuals based on the accuracy metric; adapt the feedback threshold based on the accuracy metric; and/or adapt the detection threshold based on: the feedback from the set of individuals and/or an economic value associated with the feature. In some embodiments, the computer system retrains the configurable detector based on the updated labeled data.

In this way, the computer system (for example, software executed in an environment, such as an operating system, of the computer system) may assist the user by accurately identifying and annotating features that are of interest to the user. Moreover, the image-processing technique may allow the user to analyze a wide variety of features in images even when the labeled data used to train the configurable detector initially includes too few (or even no) instances of these features (for example, the configurable detector may initially be trained using data for another feature that has similar characteristics or attributes when no features are initially available for training). This bootstrapping capability may allow the image-processing technique to be used to dynamically evolve the configurable detector so that the accuracy of the feature identification and annotation are improved over time, thereby reducing or eliminating user frustration. Consequently, the image-processing technique may enhance the user experience when using the computer system.

In some embodiments of method 200, there may be additional or fewer operations. Moreover, the order of the operations may be changed, and/or two or more operations may be combined into a single operation.

Figure 3:
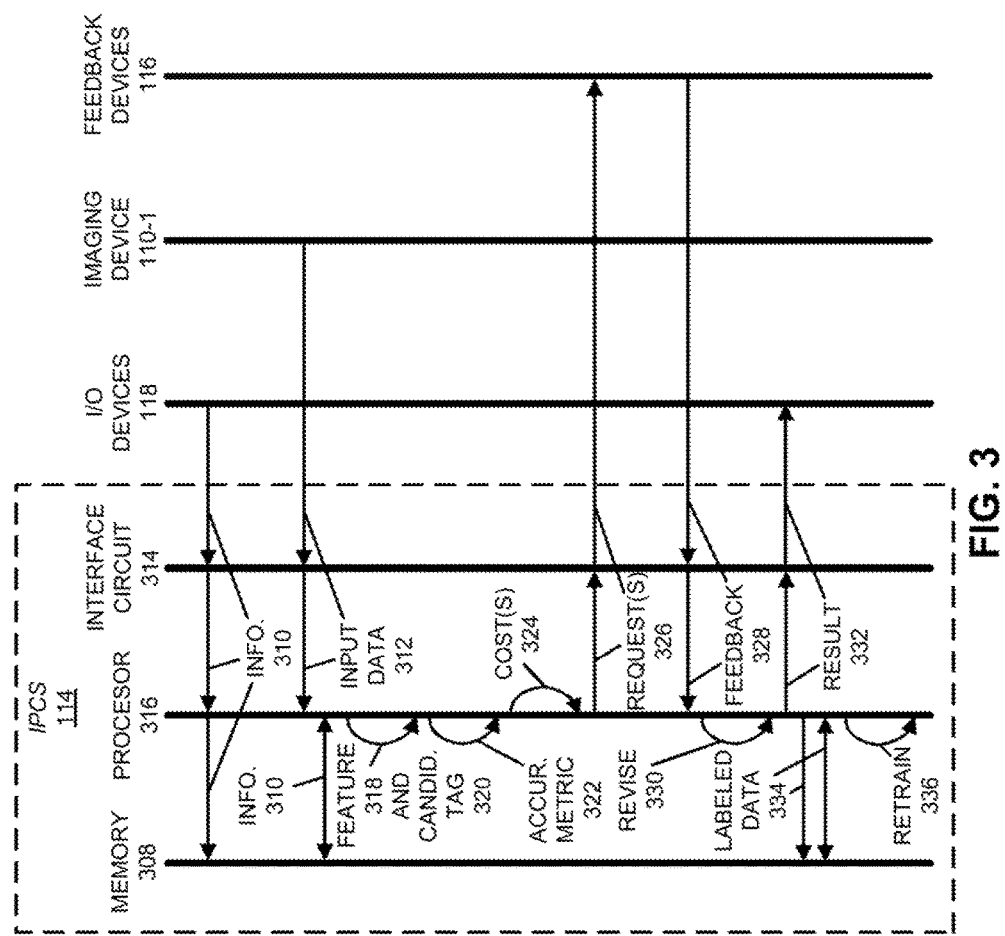
FIG. 3 is a drawing illustrating communication among components in the system in FIG. 1 in accordance with an embodiment of the present disclosure.

Embodiments of the image-processing technique are further illustrated in FIG. 3, which presents a drawing illustrating communication among components in system 100 (FIG. 1). In particular, during the image-processing technique, a user of one of I/O devices 118 may provide information 310 to image-processing computer system 114 that specifies user-defined items of interest, such as one or more features that can be identified in an image and one or more tags or labels associated with the one or more features. This information may be received by an interface circuit 314, which provides it to a processor 316, and processor 316 may store information 310 in memory 308. Subsequently, imaging device 110-1 may provide input data 312 (such as at least one image, metadata and/or other types of data than an image) to image-processing computer system 114.

After receiving input data 312, interface circuit 314 in image-processing computer system 114 may provide input data 312 to processor 316. Then, processor 316 may identify a feature 318 in at least the one image and an associated candidate tag 320 using a configurable detector and based on the user-defined items of interest. Note that processor 316 may access stored information 310 in memory 308 when identifying feature 318 and associated tag 320. Moreover, processor 316 may determine a accuracy metric 322 for the identified feature and the candidate tag using the configurable detector based on feature 318 and candidate tag 320.

Next, processor 316 may selectively obtain feedback having a feedback accuracy about feature 318 and/or candidate tag 320 from a set of one or more individuals. For example, processor 316 may provide one or more requests 326 to interface circuit 314, which provides these requests to one or more of feedback devices 116 associated with the set of one or more individuals. In particular, processor 316 may determine that feedback is needed if the accuracy metric is less than a feedback threshold. Alternatively processor may determine that feedback is needed if the accuracy metric is greater than a feedback threshold based on an output from a random or pseudorandom number generator. In some embodiments, processor 316 determines whether or not to obtain feedback based on predefined or a dynamically determined cost(s) 324 of obtaining the feedback from the set of one or more individuals. In response, interface circuit 314 may receive feedback 328 from one or more of feedback devices 116 (and, thus, from the set of one or more individuals), which provides feedback 328 to processor 316.

Based on feedback 328 (such as when feedback 328 indicates feature 318 and/or candidate tag 320 are incorrect), processor 316 may revise 330 feature 318 and/or candidate tag 320.

Furthermore, processor 316 may provide a result 332 to interface 314, which provides result 332 to one or more of I/O devices 118. For example, result 332 may include: feature 318 and candidate tag 320 when the accuracy metric exceeds a detection threshold; or feature 318 and a revised tag when the feedback accuracy exceeds the detection threshold. In some embodiments, when a give one of I/O devices 118 receives result 332, it may be automatically displayed on this I/O device (i.e., without further user action). For example, an application may automatically launch on the I/O device, and the application may automatically display result 332 on the I/O device.

Additionally, processor 316 may update labeled data 334 stored in memory 308 to include the input data, feature 318 and one of candidate tag 320 and the revised tag. In some embodiments, processor 316 retrains 336 the configurable detector based on the updated labeled data 334.

In an exemplary embodiment, the image-processing technique is used to provide computer vision as a service to other organizations, companies, entities and/or individuals. For example, a computer system may receive, via a machine interface (such as an application programming interface associated with a program module that implements the image-processing technique), input data (including images) from a wide variety of sources, such as: aviation drones, security cameras, closed-circuit television, a wearable appliance, a nanny camera, an image sensor, etc. Note that the input data may be received in real time (such as frame by frame as an image is acquired) and/or as a batch upload. After receiving one or more images in the input data, the computer system may perform one or more optional operations to improve the image quality or to generate multiple versions of the image that can be used in subsequent analysis. For example, the computer system may use a multi-image reconstruction technique.

Then, the computer system may analyze an image (e.g., in real time or near real time based on the available computer-system resources) using a configurable detector to identify a feature (such as at least a portion of a thing or an object in the image, e.g., one or more edges or line segments in the object, a geometric relationship between two or more edges or line segments, etc.) and an associated candidate tag (or annotation) based on previously specified user-defined items of interest (which may have been previously provided by a user via an I/O device, such as a computer or a cellular telephone, and a machine interface). For example, the computer system may analyze images associated with: a pipeline, agriculture, a hotel, etc. Moreover, the user-defined items of interest may specify one or more features and associated tags or annotations that are of interest to the user.

Note that the computer system may be a multi-tenant or customer system that is segmented on a per-customer basis. For example, the computer system may include multiple configurable detectors that are associated with different tenants, different images, different features, different sources (such as configurable detector that is associated with a particular camera), etc. However, one or more of the configurable detectors may be global, i.e., used by some or all of the tenants. In some embodiments, the computer system includes different domains for the different tenants, such as separate virtual machines that isolate the input data and the analysis for the different tenants from each other.

The configurable detectors may include or may be based on supervised or machine-learning techniques, such as: a neural network (e.g., a convolutional neural network), support vector machines, classification and regression trees, logistic regression, LASSO, linear regression and/or another (linear or nonlinear) supervised-learning technique. Moreover, the configurable detectors may have: invariance to specific transformations (e.g., similarity transformations, affine transformations, etc.); robustness to photometric distortions and noise; computational efficiency; and, depending on the particular task, the ability to generalize to feature or object categories. Furthermore, the configurable detectors may include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), etc.

The configurable detectors may be trained using labeled data, such as one or more instances of the feature and an associated tag in one or more previous images, as well as metadata associated with the images, such as: a location where an image was acquired, a type of source, an identifier of a particular source, an attribute of the image, image-quality metrics, a time of day, etc. For example, a training module executed by the computer system may perform hyper-parameter optimization in a multi-dimensional space of parameters to determine one or more configurable detectors (such as 1000 configurable detectors) based on labeled data and the metadata, so that the best performing configurable detectors for particular features and/or images can be determined. Note that in some embodiments the configurable detectors are trained using back propagation based on the labeled data.

However, because of the difficulty in initially having or obtaining sufficient, accurate labeled data that can be used to train at least one of the configurable detectors for an arbitrary feature and tag, the computer system may perform feedback active learning. In particular, the computer system may obtain feedback from a set of one or more individuals on the identified feature and the candidate tag. For example, the computer system may interact with the set of one or more individuals to classify and/or label data (such as 'good' or 'bad'). Thus, the interaction with the set of one or more individuals may provide closed-loop feedback that acts as a first-level filter that improves the accuracy of a training dataset and the performance of the computer system.

As noted previously, in order to obtain feedback having a high feedback accuracy (i.e., high-quality feedback), a scheduler executed by the computer system may be designed to respect the time and effort of the set of one or more individuals. For example, the scheduler may selectively obtain the feedback from a given one of the set of one or more individuals. Moreover, when feedback is requested from a given individual (via an associated feedback device, such as a cellular telephone, and a machine interface), the feedback may be collected efficiently, e.g., using categorical questions (such as yes/no questions) and/or by integrated the feedback collection into the given individual's workflow.

Thus, the scheduler may determine what is surfaced to a human (a type of feedback requested), and which individuals are contacted by the computer system via their associated feedback devices and when (such as based on a predicted accuracy of the identified feature and the candidate tag, as well as a feedback threshold). In particular, feedback may be requested for a bird identified in an image that has less than 50% estimated or predicted accuracy. Moreover, the scheduler may probabilistically or statistically determine the individuals that are contacted based on their expertise (i.e., who's feedback is likely to be of interest), historical feedback accuracy (such as a variance in the feedback accuracy previously received from an individual) and a cost of requesting feedback. For example, the cost may be determined based a user-specified mean-interruption time, such as a user request to provide feedback on detected features in the last 15 min. Note that initially the scheduler may present identified features and annotations often to individuals for feedback, but over time the feedback frequency or probability may decrease.

Figure 4:
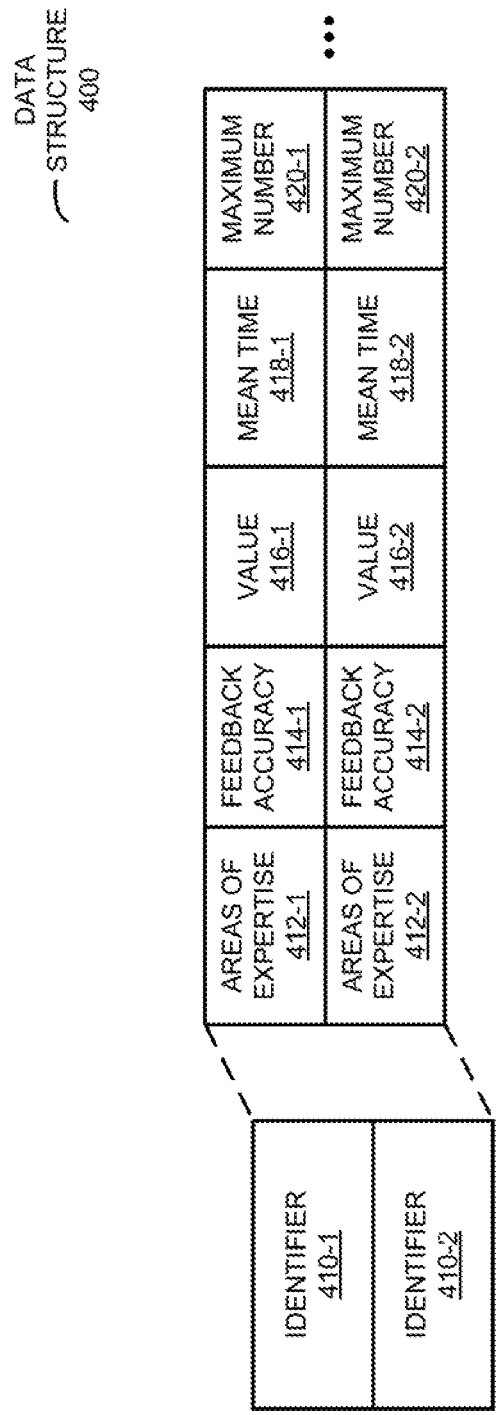
FIG. 4 is a drawing illustrating a data structure that is used during dynamic selection of a given individual in a set of individuals by a scheduler in the system in FIG. 1 in accordance with an embodiment of the present disclosure.

FIG. 4 presents a drawing illustrating a data structure 400 that is used during dynamic selection of a given individual in a set of individuals by a scheduler in system 100 (FIG. 1). In particular, the scheduler may use data structure 400 that includes information used to dynamically select a set of one or more individuals. For example, for individuals specified by identifiers 410, data structure 400 may include: areas of expertise 412 of the individuals, associated feedback accuracy 414 (such as a historical average of the feedback accuracy for the individuals or the feedback accuracy of their most-recent feedback), as well as user-defined or specified feedback information, such as a value 416 of the feature identification and annotation, a mean time 418 between feedback requests, a maximum number 420 of feedback requests per a particular time interval (such as per day or week), etc. Using this information, the scheduler map areas of expertise 412 to user-defined items of interest (such as features and/or tags), e.g., based on a match score between attributes and/or metadata for the items and the areas of expertise 412. In particular, using the attributes and/or the metadata, as well as their synonyms, the scheduler may generate a query expression. This query expression may be compared to the areas of expertise 412 and a match score for a given individual may be the weighted sum of the matches between the words or phrases in the query expression and the areas of expertise 412. Then, match scores exceeding a threshold or the top-N match scores may be identified.

After optionally excluding identified individuals with feedback accuracies that are too low, the scheduler may calculate costs for the remaining identified individuals. For example, for a given individual, the scheduler may: decrease the cost if the user-specified value 416 is high, increase the cost if a time duration since the last feedback request is less than mean time 418, etc. Moreover, if maximum number 420 of feedback requests has been exceeded, the costs may be effectively infinite (i.e., the given individual may not be contacted at this time for feedback).

Next, the scheduler may rank the calculated costs for the remaining identified individuals. Individuals with a lower cost may be preferentially contacted for feedback relative to those with higher costs. However, the dynamic selection may not be completely deterministic (such as selecting individuals having a cost less than a threshold). Instead, the individuals may be selected probabilistically. The probability of being selected may be an inverse function of the calculated cost, so it is less likely that individuals with high cost values are selected.

Once the set of one or more individuals are selected, the scheduler may select the type of feedback and may request the feedback. For example, the scheduler may provide instructions for or information that specifies a user interface with the desired type of feedback to feedback devices associated with the set of one or more individuals. Then, instances of an application executing on the feedback devices may display the user interface and may receive the feedback in the form of user-interface activity performed by the set of one or more individuals. In some embodiments, when a request for feedback is received at a particular feedback device, the application may launch automatically and may automatically display the user interface without action by the given individual. After the given individual makes their selections in the user interface (e.g., by activating virtual icons in the user interface), this feedback information may be communicated back to the computer system.

Figure 5:
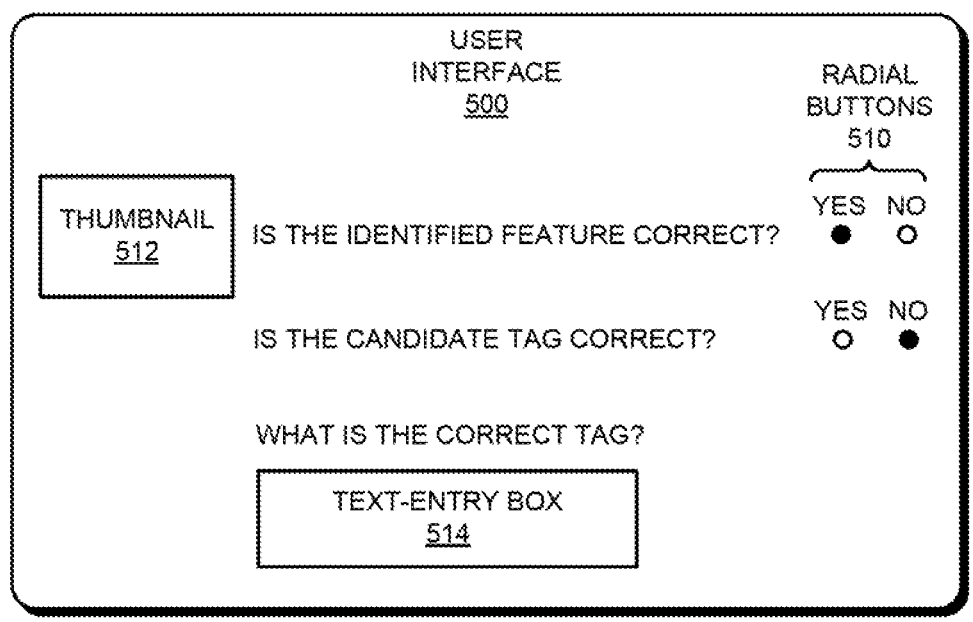
FIG. 5 is a drawing illustrating a user interface that the given individual can use to provide feedback in a feedback device in the system in FIG. 1 in accordance with an embodiment of the present disclosure.

As an illustration, FIG. 5 presents a drawing illustrating a user interface 500 that the given individual can use to provide feedback in a feedback device in system 100 (FIG. 1). In particular, user interface 500 includes yes/no categorical questions that the given individual can answer to provide feedback. For example, user interface 500 may include radial buttons 510 and a thumbnail image 512 of the identified feature (or a graphical representation of the identified feature). In addition, if the given individual indicates that the identified feature and/or the candidate tag are incorrect, the given individual can provide correction information, e.g., by typing the correction information into a text-entry box 514 or by verbally providing the correction information (which may be converted to text using a speech-recognition technique).

Note that the details of the feedback may be stored by the scheduler in a historical log, which may be used to select the individuals used in future feedback requests. For example, the historical log may include: the type of feedback requested, a timestamp when the feedback was requested, whether a response was received, how long it took to receive the response, the feedback accuracy, etc.

Furthermore, the feedback from the set of one or more individuals may be used to revise the labeled data. Then, the training model may use the updated labeled data to retrain and, over time, to improve the accuracy of the candidate detectors. (Thus, the training model may perform active learning.) Furthermore, the feedback may be used, as needed, by a revision module executed by the computer system to revise the identified feature and/or the candidate tag. When the identified feature and/or the candidate tag are changed based on the feedback, this labeled data may be given a higher weight by the training model when retraining the candidate detectors, so that the probability that the retrained candidate detectors make such errors is reduced.

If a predicted accuracy result from one of the candidate models exceeds a detection threshold, a presentation module may present the result to one or more individuals (via one or more I/O devices and a machine interface). Thus, the detection threshold may be used to selectively filter notifications that are provided to the one or more individuals.

We now describe pseudo-code for operations in embodiments of the image-processing technique. As described previously, the system may adapt the rate of user-feedback requests based on the current accuracy of the system and/or the confidence of the detected features and candidate tags. In some embodiments, individual detections are surfaced using two processes: a random process that ensures some even or uniform sampling across the detections; and a second process that periodically selects the most-useful detections to surface. Table 1 provides pseudo-code for the random process for user-feedback selection.

TABLE 1

```
def process_new_detection(application, detection):
    # get the current application accuracy
    current_accuracy = application.current_accuracy( )
    # Map the current application accuracy to a feedback
    detection probability
    # (for example: random_feedback_probability = 1 − current_accuracy)
    # This allows less accurate models to collect more random feedback
    randam_feedback_probability =
        map_accuracy_to_feedback_prob(current_accuracy)
    if random( ) < random_feedback_probability:
        # This detection is selected fbr random feedback
        request_feedback(detection)
    else:
        # This detection is not selected for random feedback.
        # Queue this detection for periodic feedback consideration
        queue_detection_for_later_consideration(detection)
```

In the second (periodic) process, the system may regularly check the queued list of recent detections in order to determine which detections provide the most-valuable incremental information. For example, in one approach, the system may surface those detections that have the lowest confidence values associated with them. Table 2 provides pseudo-code for the second process for user-feedback selection.

TABLE 2

```
def periodic_feedback_handler(recent_detections):
    # get the lowest confidence detection from all of the recent_detections
    # (e.g. as sorted by detection.confidence)
    detection = get_lowest_confidence_detection(recent_detections)
    # surface this detection for feedback
    request_feedback(detection)
    # remove this detection from recent_detections
    remove(recent_detections, detection)
    # remove some of the older detections from the front of the queue
    remove_older_detections(recent_detections)
```

Note that other metrics can be used instead of confidence to decide which items to surface for user feedback. For example, an entropy-based metric may be generated. This entropy-based metric may encode or specify the average information content of a particular detection. In this case, the result of the second (periodic) user-selection process may select the detection with the highest average information content instead of the feature or item with the lowest detection confidence. However, in both cases the frequency with which the periodic feedback is requested may be a configurable application parameter that can be adapted as a function of the application accuracy.

In some embodiments, it may be desirable to limit the rate of feedback requested from individual users. In these embodiments, a periodic feedback handler can be run separately for each user of the system. Moreover, each user may have a configurable feedback period that controls the frequency of feedback requests to the particular user. Table 3 provides pseudo-code for such configurable user-feedback periods.

TABLE 3

```
def periodic_feedback_handler(recent_detections, user):
    # get the lowest confidence detection from all of the recent_detections
    # (e.g. as sorted by detection.confidence)
    detection = get_lowest_confidence_detection(recent_detections)
    # surface this detection for feedback
    request_feedback(detection, user)
    # remove this detection from recent_detections
    remove(recent_detections, detection)
    # remove some of the older detections from the front of the queue
    remove_older_detections(recent_detections)
```

In some embodiments, the system monitors the feedback accuracy of the individual users by comparing each user's historical feedback with the eventual consensus (across multiple users) for the feedback feature or item. This may be a powerful technique when coupled with a cost metric for each user, which may correspond to the cost (either actual monetary cost or some similar proxy metric) of requesting feedback from the user. For example, an expert may have a higher cost of interruption than a non-expert in a particular domain. By combining the accuracy score of each individual user with the cost of the corresponding user, it is possible to select the lowest cost combination of feedback requests that achieve some minimum desired level of accuracy. This approach is illustrated by the pseudo-code in Table 4.

TABLE 4

```
def schedule_feedback(detection, user_list, desired_accuracy):
    desired_error = 1−desired accuracy
    # calculate for each user an effective cost to achieve the
    desired accuracy
    for user in user_list:
        user_error = 1 − user accuracy
        user.effective_cost = user.cost * log(desire_error) /
    log(user_error)
    # sort the users by their effective cost
    sorted_user_list = sort(user_list, user.effective_cost)
    # find the smallest set of users with the lowest effective cost
    # which will produce the desired effective accuracy
    current_error = 1
    feedback_user_list = List( )
    for user in sorted_user_list:
        feedback_user_list.append(user) # request feedback from this user
        # calculate the expected reduction in error resulting from
        # feedback from this user
        current_error *= (1 − user.accuracy)
        # we are done when the expected current_error is below the
        # desired error
        if current error <= desired_error:
            break
    # ask for feedback on this detection from the low cost user set
    schedule_feedback(detection, feedback_user_list)
```

In an exemplary embodiment, the system includes configurable detectors on a per-tenant (i.e., per customer), per-application basis. The detectors may be configured via a publically accessible application programming interface, a web interface, or a mobile-application interface. Moreover, the per-application detectors may be configured by specifying a list of 'tags' or 'subject tags,' such as words or short phrases describing the visual entity or feature that is to be detected.

Note that the per-application tags may be used to query the 'labeled data' dataset to produce a per-application training image set. The 'labeled data' dataset may maintain a mapping between established subject tags and associated images. Moreover, the system may, on a per-application basis, use the configured subject tags to dynamically assemble the set of images used to train and test the configurable detectors. This selection and assembly may occur as an ongoing process as the labeled data grows over time, and in particular, in response to user feedback on new image detections.

Furthermore, the per-application training image set may be used to periodically train or retrain a per-application detection model or a configurable detector. For example, the detection models may be implemented using convolutional neural networks. In a typical training regime, a large convolutional network model may include 60 M parameters and 650,000 neurons. The convolutional network model may include eight learned layers with weights, including five convolutional layers and three fully connected layers with a final 1000-way softmax that produces a distribution over the 1000 class labels. Some of the convolution layers may be followed by max-pooling layers. In order to make training faster, the convolutional network model may use non-saturating neurons (such as a local response normalization) and an efficient dual parallelized graphical-processing-unit (GPU) implementation of the convolution operation. In addition, in order to reduce overfitting in the fully-connected layers, a regularization technique (which is sometimes referred to as 'dropout') may be used. In dropout, the predictions of different models is efficiently combined to reduce test errors. In particular, the output of each hidden neuron is set to zero with a probability of 0.5. The neurons that are 'dropped out' in this way do not contribute to the forward pass and do not participate in backpropagation. Note that the convolutional network model may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer. Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In an exemplary embodiment, the first convolutional layer filters a 224×224×3 input image with 96 kernels of size 11×1×3 with a stride of four pixels (this is the distance between the receptive field centers of neighboring neurons in a kernel map). Note that the second convolutional layer may take as input the (response-normalized and pooled) output of the first convolutional layer and may filter it with 256 kernels of size 5×5×48. Furthermore, the third, fourth, and fifth convolutional layers may be coupled to one another without any intervening pooling or normalization layers. The third convolutional layer may have 384 kernels of size 3×3×256 coupled to the (normalized, pooled) outputs of the second convolutional layer. Additionally, the fourth convolutional layer may have 384 kernels of size 3×3×192, and the fifth convolutional layer may have 256 kernels of size 3×3×192. The fully-connected layers may have 4096 neurons each. Note that the numerical values in the preceding and the remaining discussion below are for purposes of illustration only, and different values may be used in other embodiments.

In some embodiments, the convolutional network model is implemented using at least two GPUs. One GPU may run some of the layer parts while the other runs the remaining layer parts, and the GPUs may communicate at certain layers. The input of the convolutional network model may be 150,528-dimensional, and the number of neurons in the remaining layers in the convolutional network model may be given by 253,440-186,624-64,896-64,896-43,264-4096-4096-1000.

The convolutional network model may be pre-trained on a dataset, such as 'Imagenet,' may be repeatedly subjected to the per-application training image set and retrained using a backpropagation technique, in which errors in the output from the convolutional network model may be used as feedback to adjust the parameters in the convolutional network model until the detection output error reaches some minimum level (such as 1, 5 or 10%).

Once a trained detection model is available for a particular application, it can be deployed as part of the system or downloaded from the system for remote deployment. When a model is deployed as part of the system, images input into the system may be routed to a particular model based on the per-application configuration. The input images may then be processed by the previously trained per-application convolutional neural network to produce an output result unique to the application. Moreover, the output result may include a list of probabilities for the subject tags associated with the application. These can be interpreted as the probability that each of the subject tags for the application exists within the input image. In some embodiments, output coordinates specifying the location of the subjects in the input image can also be produced by the convolutional neural network.

Based on the per-application configuration, the detections can be surfaced via a programmatic interface or via a user feedback interface. For example, the application configuration may include rules for surfacing detections on a per-subject tag basis. In this way, detections (particularly low-confidence detections, such as those with estimated accuracy less than 50%) may be surfaced to a selected user for additional confirmation or correction. Once confirmed or corrected, these detections may be added to the labeled data and used as the basis for the next training iteration.

While the preceding discussion uses images with content in the visible spectrum as an illustration, in other embodiments other types of content may be provided to the computer system that implements the image-processing technique. Thus, the input data may include a variety of other types of content, including: audio, measurements of an environmental condition (such as the temperature, humidity, barometric pressure, wind direction, wind speed, reflected sunlight, etc.), images associated with different wavelengths of light (such as infrared images, ultraviolet images or x-ray images), acoustic imaging (such as ultrasound or seismic measurements), radar images, etc. In some embodiments, the images are of at least a portion of an individual (instead of an environment). Thus, the images processed by the computer system may include medical images or medical information, such as data from: computed tomography, magnetic resonance imaging, an electroencephalogram, an ultrasound, positron emission spectroscopy, an x-ray, etc.

Moreover, while the preceding discussion illustrated the use of a particular configurable detector to analyze an image, in other embodiments multiple configurable detectors are used concurrently. In this ensemble approach, over time the best performing configurable detector or detectors for a particular feature and tag may be identified.

Furthermore, in the preceding discussion, the source of the input data included a physical camera or image sensor. However, in other embodiments the source may include a 'virtual camera', such as an electronic device, computer or server that provides images to the computer system for analysis. Thus, the image-processing technique may be used to analyze images that have recently been acquired and/or to analyze existing images. For example, the image-processing technique may be used to analyze images associated with a social network of interacting individuals who exchange or post content, including images.

We now describe embodiments of an electronic device. FIG. 6 presents a block diagram illustrating an electronic device 600, such as one of imaging devices 110, image-processing computer system 114, one of feedback devices 116 or one of I/O devices 118 in FIG. 1. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618, one or more antennas 620 and/or input/output (I/O) port 630. (While FIG. 6 includes one or more antennas 620, in some embodiments electronic device 600 includes one or more nodes 608, e.g., a pad, which can be coupled to one or more antennas 620. Thus, electronic device 600 may or may not include one or more antennas 620.) For example, networking subsystem 614 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc. Moreover, electronic device 600 may include an imaging subsystem 632 with one or more image sensor for acquiring or capturing one or more images. (More generally, electronic device 600 may include a monitoring subsystem with one or more sensors for monitoring or measuring in an environment or of an individual.)

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smart watch, a consumer-electronic device, a portable computing device, an access point, a router, a switch, communication equipment, test equipment, a security camera, an aviation drone, a nanny camera, a wearable appliance, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, display subsystems and/or audio subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments, some or all of a given subsystem or component can be integrated into one or more of the other subsystems or component(s) in electronic device 600. For example, in some embodiments program module 622 is included in operating system 624.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While communication protocols compatible with Ethernet and Wi-Fi were used as illustrative examples, the described embodiments of the image-processing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the image-processing technique may be implemented using program module 622, operating system 624 (such as a driver for interface circuit 618) and/or in firmware in interface circuit 618. Alternatively or additionally, at least some of the operations in the image-processing technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A system, comprising:
   an interface circuit that, during operation, communicates, via a network, with another electronic device;
   a processor, and
   memory, coupled to the processor, which stores a program module that, during operation, is executed by the processor, the program module including:
   instructions for receiving input data including an image;
   instructions for identifying, using a configurable detector associated with labeled data, a feature in the image and an associated candidate tag based on user-defined items of interest, and determining an associated accuracy metric based on the feature and the candidate tag, wherein the user-defined items of interest include one or more features and one or more associated tags;
   instructions for selectively obtaining, using a scheduler, feedback, having a feedback accuracy, about the candidate tag from a set of individuals based on the accuracy metric, a cost of requesting the feedback and a feedback threshold, wherein the scheduler dynamically selects a given individual in the set of individuals based on a given cost of requesting the feedback from the given individual;
   instructions for generating a revised tag based on the feedback when the feedback indicates the candidate tag is incorrect;
   instructions for presenting a result to the other electronic device, wherein the result includes one of: the feature and the candidate tag when the accuracy metric exceeds a detection threshold; and the feature and the revised tag when the feedback accuracy exceeds the detection threshold; and
   instructions for updating, based on a quality metric, the labeled data to include the input data, the feature and one of the candidate tag and the revised tag, wherein the updated labeled data are to be used to retrain the configurable detector.

2. The system of claim 1, wherein the accuracy metric is one of: a probability of accuracy, a distance from a target and the probability of accuracy and the distance from the target.

3. The system of claim 1, wherein the cost is determined based on user-specified information and behavior of the given individual in response to prior requests for feedback.

4. The system of claim 3, wherein the user-specified information includes one or more of: a frequency of feedback requests, a number of feedback requests, and a value of the feedback.

5. The system of claim 1, wherein the scheduler further dynamically selects the given individual based on at least one of: an area of expertise of the given individual, behavior of the given individual in response to prior requests for feedback, and a feedback accuracy of prior feedback from the given individual.

6. The system of claim 1, wherein the program module further comprises instructions for adjusting types of feedback obtained from the set of individuals based on the accuracy metric.

7. The system of claim 1, wherein the feedback from the given individual includes one of: a first indication that the candidate tag is correct, a second indication that the candidate tag is incorrect, and a third indication that it is unknown whether the candidate tag is correct.

8. The system of claim 7, wherein, when the feedback includes the second indication, the feedback further includes a correction for the candidate tag.

9. The system of claim 1, wherein the program module further comprises instructions for adapting the feedback threshold based on the accuracy metric.

10. The system of claim 1, wherein the program module further comprises instructions for adapting the detection threshold based on: the feedback from the set of individuals; and an economic value associated with the feature.

11. The system of claim 1, wherein the set of individuals includes two or more individuals and the feedback accuracy for the given individual is based on the feedback obtained from the set of individuals.

12. The system of claim 1, wherein the input data further includes other types of data than the image.

13. The system of claim 1, wherein the program module further comprises instructions for receiving metadata associated with the input data; and
wherein the metadata includes one or more of: information specifying a location of a source of the input data, a type of the source, other features in the image than the feature, attributes of the image other than the candidate tag, and a time of day the image was acquired.

14. The system of claim 13, wherein the program module further comprises instructions for:
selecting a subset of the labeled data based on the metadata; and
training the configurable detector based on the selected subset.

15. The system of claim 13, wherein the program module further comprises instructions for selecting the configurable detector in a set of configurable detectors based on the metadata.

16. The system of claim 1, wherein the feedback is obtained when the accuracy metric is less than the feedback threshold.

17. The system of claim 1, wherein, when the accuracy metric is greater than the feedback threshold, the feedback is obtained based on one of: a pseudorandom value, and a random value.

18. The system of claim 1, wherein the quality metric is based on one or more of: the accuracy metric, the feedback accuracy, and a number of individuals in the set of individuals.

19. The system of claim 1, wherein the program module further comprises instructions for retraining the configurable detector based on the updated labeled data.

20. The system of claim 1, wherein presenting the result involves automatically triggering an application on the other electronic device that presents the result.

21. A system, comprising:
a configurable detector, associated with labeled data, comprising a non-transitory computer readable medium storing instructions that, when executed, cause the system to:
receive input data including an image; and
identify a feature in the image and an associated candidate tag based on user-defined items of interest, and determine an associated accuracy metric based on the feature and the candidate tag, wherein the user-defined items of interest include one or more features and one or more associated tags;
a scheduler comprising a non-transitory computer readable medium storing instructions that, when executed, cause the system to selectively obtain feedback, having a feedback accuracy, about the candidate tag from a set of individuals based on the accuracy metric, a cost of requesting the feedback and a feedback threshold, wherein the scheduler dynamically selects a given individual in the set of individuals based on a given cost of requesting the feedback from the given individual;
a revision module comprising a non-transitory computer readable medium storing instructions that, when executed, cause the system to generate a revised tag based on the feedback when the feedback indicates the candidate tag is incorrect;
a presentation module comprising a non-transitory computer readable medium storing instructions that, when executed, cause the system to present a result to another electronic device, wherein the result includes one of: the feature and the candidate tag when the accuracy metric exceeds a detection threshold; and the feature and the revised tag when the feedback accuracy exceeds the detection threshold; and
a training module comprising a non-transitory computer readable medium storing instructions that, when executed, cause the system to update, based on a quality metric, the labeled data to include the input data, the feature and one of the candidate tag and the revised tag, wherein the updated labeled data are to be used to retrain the configurable detector.

22. A computer-program product for use in conjunction with a system, the computer-program product comprising a non-transitory computer-readable storage medium and a computer-program mechanism embedded therein to provide results, the computer-program mechanism including:
instructions for receiving input data including an image;
instructions for identifying, using a configurable detector associated with labeled data, a feature in the image and an associated candidate tag based on user-defined items of interest, and determining an associated accuracy metric based on the feature and the candidate tag, wherein the user-defined items of interest include one or more features and one or more associated tags;
instructions for selectively obtaining, using a scheduler, feedback, having a feedback accuracy, about the candidate tag from a set of individuals based on the accuracy metric, a cost of requesting the feedback and a feedback threshold, wherein the scheduler dynamically selects a given individual in the set of individuals based on a given cost of requesting the feedback from the given individual;
instructions for generating a revised tag based on the feedback when the feedback indicates the candidate tag is incorrect;
instructions for presenting a result to the other electronic device, wherein the result includes one of: the feature and the candidate tag when the accuracy metric exceeds a detection threshold; and the feature and the revised tag when the feedback accuracy exceeds the detection threshold; and instructions for updating, based on a quality metric, the labeled data to include the input data, the feature and one of the candidate tag and the revised tag, wherein the updated labeled data are to be used to retrain the configurable detector.

23. A method for selectively presenting results, the method comprising:

receiving input data including an image;

identifying, using a configurable detector associated with labeled data, a feature in the image and an associated candidate tag based on user-defined items of interest, and determining an associated accuracy metric based on the feature and the candidate tag, wherein the user-defined items of interest include one or more features and one or more associated tags;

selectively obtaining, using a scheduler, feedback, having a feedback accuracy, about the candidate tag from a set of individuals based on the accuracy metric, a cost of requesting the feedback and a feedback threshold, wherein the scheduler dynamically selects a given individual in the set of individuals based on a given cost of requesting the feedback from the given individual;

generating a revised tag based on the feedback when the feedback indicates the candidate tag is incorrect;

presenting the result to the other electronic device, wherein the result includes one of: the feature and the candidate tag when the accuracy metric exceeds a detection threshold; and the feature and the revised tag when the feedback accuracy exceeds the detection threshold; and updating, based on a quality metric, the labeled data to include the input data, the feature and one of the candidate tag and the revised tag, wherein the updated labeled data are to be used to retrain the configurable detector.

* * * * *